(12) United States Patent
Misso et al.

(10) Patent No.: US 6,212,927 B1
(45) Date of Patent: Apr. 10, 2001

(54) ACUTUATOR ASSEMBLY DEBRIS REDUCTION

(75) Inventors: Nigel F. Misso, Bethany; Inman L. Jones, Yukon; Daniel M. Heaton, Yukon; Dana P. Eddings, Yukon, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/407,223

(22) Filed: Sep. 24, 1999

Related U.S. Application Data
(60) Provisional application No. 60/101,881, filed on Sep. 25, 1998.

(51) Int. Cl.[7] .................................................. B21B 27/06
(52) U.S. Cl. ................................................ 72/75; 29/90.01
(58) Field of Search ................................. 72/75; 29/90.01

(56) References Cited

U.S. PATENT DOCUMENTS

| | | |
|---|---|---|
| 2,222,270 | 11/1940 | Wallace . |
| 3,130,477 | 4/1964 | Gill . |
| 3,470,729 | 10/1969 | Andrs et al. . |
| 3,587,269 | 6/1971 | Seccombe et al. . |
| 3,656,333 | 4/1972 | Kruse, Jr. . |
| 3,934,443 * | 1/1976 | Kee ............................................ 72/75 |
| 4,005,591 | 2/1977 | Werner . |
| 4,054,976 | 10/1977 | Ewald et al. . |
| 4,189,932 | 2/1980 | Fielder . |
| 4,573,340 | 3/1986 | Kammeraad . |
| 4,821,388 | 4/1989 | Okumura et al. . |
| 4,916,981 | 4/1990 | Suzuki et al. . |
| 5,262,907 | 11/1993 | Duffy et al. . |
| 5,297,409 | 3/1994 | Beaman et al. . |
| 5,339,523 | 8/1994 | Hasegawa . |
| 5,524,464 * | 6/1996 | Asada et al. ........................... 72/20.1 |
| 5,539,980 | 7/1996 | Kammeraad et al. . |
| 5,673,580 * | 10/1997 | Ohno ........................................ 72/75 |
| 5,802,900 * | 9/1998 | Lee .......................................... 72/75 |
| 5,818,665 | 10/1998 | Malagrino, Jr. et al. . |
| 5,894,382 | 4/1999 | Hyde . |

FOREIGN PATENT DOCUMENTS

| | | | |
|---|---|---|---|
| 4-9222 * | 1/1992 | (JP) ......................................... 72/75 |
| 2003454 * | 11/1993 | (RU) ........................................ 72/75 |
| WO 95/19034 | 7/1995 | (WO) . |

* cited by examiner

Primary Examiner—Ed Tolan
(74) Attorney, Agent, or Firm—Crowe & Dunlevy

(57) ABSTRACT

A method of reducing debris within an E-block of an actuator assembly in a disc drive is provided. A manufactured E-block is first provided for tooling. The E-block has a central bore with an inner diameter and a bore surface. A hardening member is then provided with an outer diameter that is larger than the inner diameter of the bore surface. The hardening member is pressed through the central bore so that the hardening member compresses and deforms the bore surface. As the hardening member deforms the bore surface, the bore surface becomes substantially smooth and hard.

10 Claims, 3 Drawing Sheets

ACUTUATOR ASSEMBLY DEBRIS REDUCTION

RELATED APPLICATIONS

This application claims the benefit of U.S. Provisional Application No. 60/101,881 filed Sep. 25, 1998.

FIELD OF THE INVENTION

This invention relates generally to the field of disc drive data storage devices, and more particularly, but not by way of limitation, to a method of forming an actuator within a disc drive.

BACKGROUND OF THE INVENTION

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM issued Nov. 16, 1993 to Duffy et al. (Duffy '907), and assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

During track following in which a selected head is caused to follow a selected track, a servo processor compares the value of the PES to a desired value indicative of the desired position of the head to the selected track and issues a digital correction signal to the power amplifier, which in turn provides an analog current to the actuator coil to adjust the position of the head with respect to the track. During a seek operation in which a selected head is moved from an initial track to a destination track, relatively large currents are applied to the coil to initially accelerate and then decelerate the head towards the destination track. The velocity of the head is repeatedly measured and the current applied to the coil is adjusted in accordance with the difference between the actual velocity of the head and a velocity profile.

As will be recognized, a continuing trend in the industry is to provide disc drives at an ever decreasing cost. To this end, efforts are continually being undertaken to improve not only disc drive storage and transfer rates, but also the manufacturing of the disc drives. In an effort to increase stiffness within the actuator, tolerance rings are often disposed between the cartridge bearing and the E-block. However, the tolerance rings often create problems with debris collection on the surface of the E-block when the corrugations from the tolerance rings scrape the surface of the E-block and thereby let off flakes of material.

With continued demand for reduction in cost, there remains a continued need for improvements in actuator assembly to reduce the amount of debris collection therein. It is to such improvements that the present invention is directed.

SUMMARY OF THE INVENTION

The present invention is directed to a method of hardening an E-block to reduce debris collection therein.

As exemplified by preferred embodiments, the method involves first providing a manufactured E-block for tooling. The E-block has a central bore with an inner diameter and a bore surface. A hardening member is then provided with an outer diameter that is larger than the inner diameter of the bore surface. The hardening member is pressed through the central bore so that the hardening member compresses and deforms the bore surface. As the hardening member deforms the bore surface, the bore surface becomes substantially smooth and hard. The aluminum bore surface therefore provides a substantially smooth, hard medium upon which a tolerance ring pressingly engages after assembly. The tolerance ring will be less likely to flake off such a substantially smooth and hard contacting bore surface thereby reducing the collection of debris within the bore.

The objects, advantages and features of the present invention will be apparent from the following detailed description when read in conjunction with the drawings and appended claims.

DETAILED DESCRIPTION

Figure 1:
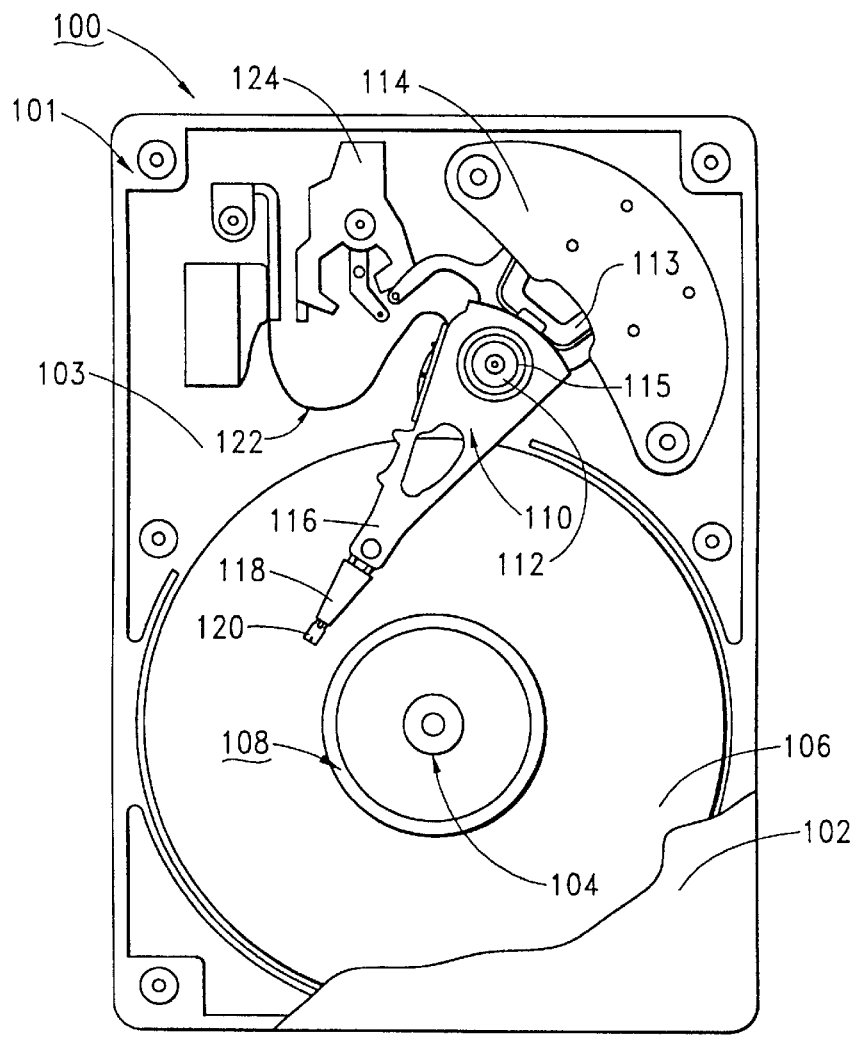
FIG. 1 is a top view of a disc drive of the type in which the present invention is particularly useful, the disc drive shown with its top cover removed.

A detailed description of various presently preferred embodiments of the present invention will commence with reference to FIG. 1 which shows a disc drive 100 used to store computer data. The disc drive 100 includes a head-disc assembly (HDA) 101 and a printed wiring assembly (PWA) which is mounted to the underside of the HDA 101. Although not visible in FIG. 1, it will be understood that the PWA is used to control the operation of the HDA 101.

A top cover (a portion of which is shown at 102) mates with a base deck 103 to provide an environmentally controlled environment for the HDA 101. A spindle motor (generally designated at 104) is supported by the base deck 103 and rotates a plurality of axially aligned discs 106 at a constant high speed. A disc clamp 108 is used to clamp the discs 106 relative to the spindle motor 104.

The discs 106 include recording surfaces (not separately identified in FIG. 1) to which user data are written by way of a rotary actuator 110 (also sometimes referred to as the E-block), which rotates about a cartridge bearing 112 in response to the application of current to a coil (113, a portion of which is visible in FIG. 1) of a voice coil motor (VCM) 114. A tolerance ring 115 is disposed about the cartridge bearing 112 and the actuator 110. The actuator 110 includes a plurality of rigid arms 116, each of which supports a corresponding flexible suspension assembly 118. Each suspension assembly 118 in turn supports a head 120 over one of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106. The landing zones are preferably texturized to prevent stiction forces from undesirably adhering the heads 120 to the landing zones.

Figure 2:
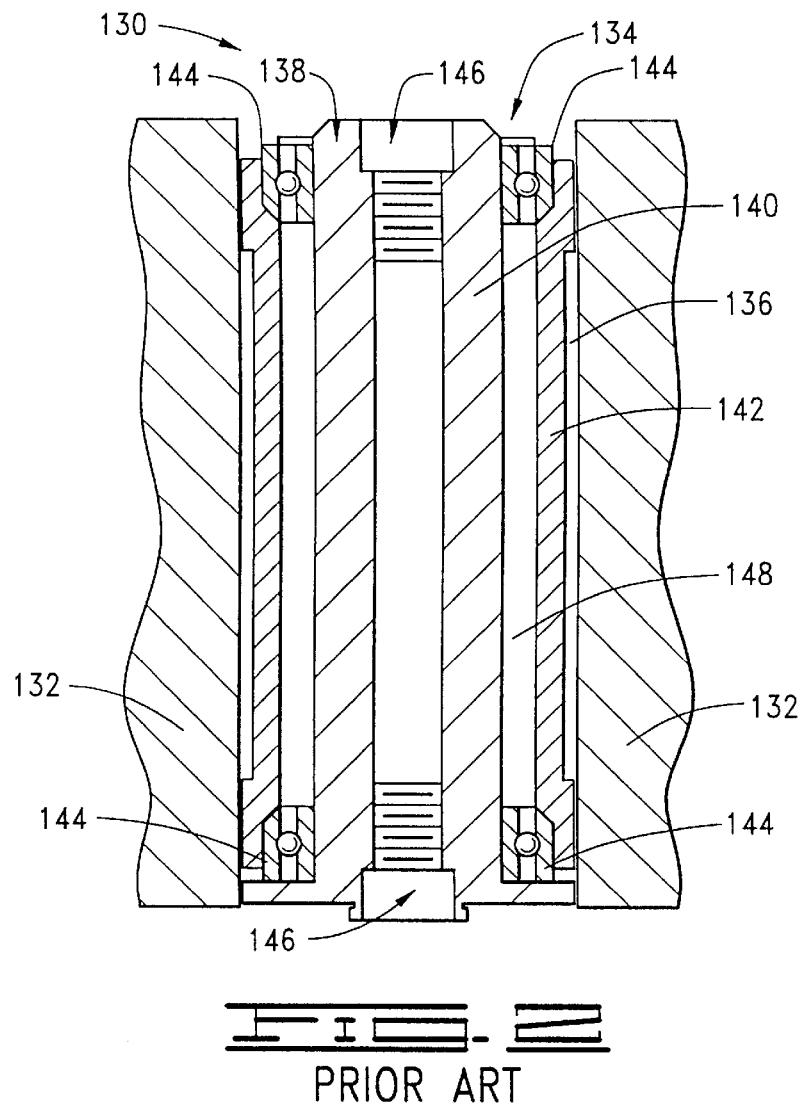
FIG. 2 is a partial cross-sectional view of a prior art actuator assembly of a disc drive.

To facilitate discussion of the problems with debris collection within an actuator assembly, FIG. 2 provides partial, cross-sectional view of a typical prior art actuator assembly 130. An E-block 132 forms a bore 134 which receivingly engages a tolerance ring 136 compressingly disposed about a cartridge bearing 138 to retain the cartridge bearing 138 within the bore 134. The cartridge bearing 138 has a stationary shaft 140 and an outer sleeve 142 separated at upper and lower ends thereof by a pair of ball bearings 144. The stationary shaft 140 has openings 146 on both ends to receive fasteners (not shown) for attachment of the stationary shaft 140 to a base deck (not shown) and to a top cover (not shown). The openings 146 are internally threaded openings to receive screw members. Therefore, in the prior art actuator assembly 130, the stationary shaft 140 is rigidly supported by the base deck and the top cover while the sleeve 142 rotates about the stationary shaft 140.

Figure 3:
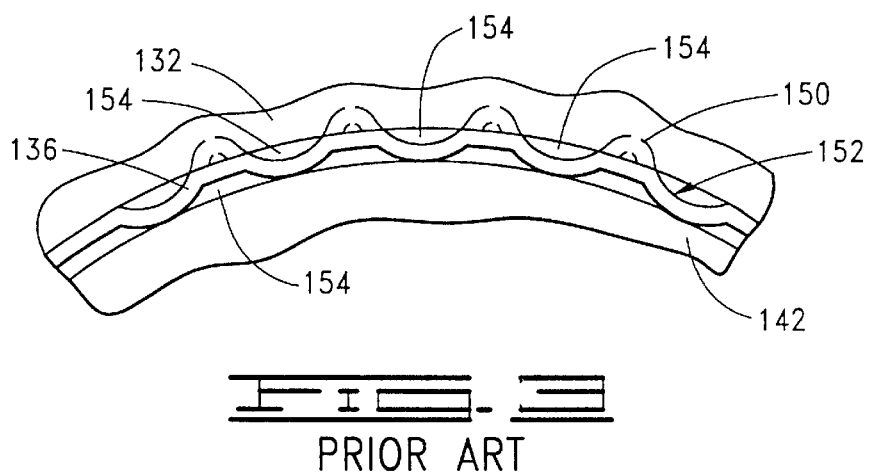
FIG. 3 is a partial cross-sectional view of a portion of an E-block and the cartridge bearing showing the compressed tolerance ring therebetween in the prior art actuator assembly of FIG. 2.

Turning now to FIG. 3, shown therein is a partial cross-sectional view of a portion of an E-block 132 and the cartridge bearing 138 showing the compressed tolerance ring 136 disposed therebetween. It will be understood from FIG. 3 that the tolerance ring 136 is sandwiched between a groove 148 of the sleeve 142 and a surface of the bore 134 of the E-block 132. The sleeve 142 and tolerance ring 136 combine to provide an effective outer diameter that is greater than the bore 134 inner diameter. As such, the sleeve 142 and tolerance ring 136 combination are press fit into the bore 134 by press fit methodology well known by one skilled in the art. The press fit compresses corrugations 150 disposed about an outer and inner surface of the tolerance ring 136 as shown in FIG. 3. The broken lines in FIG. 3 denote the shape of the corrugations 150 before insertion into the E-block 132.

The compression imparted to the corrugations 150 of the tolerance ring 136 beneficially creates sufficient frictional resistance to retain the cartridge bearing 138 within the bore 134, preventing displacement of the sleeve 142 relative to the E-block 132 in both the axial and radial directions. In this manner it will be generally understood that the tolerance ring 136 effectively fills a gap 152 between the sleeve 142 and the E-block 132 to fixedly attach the actuator assembly 130 for rotation.

However, such compression of the corrugations 150 caused by the press fitting has the effect of burnishing the surface of the bore 134 adjacent the corrugations 150. The bore 134 is made from aluminum while the tolerance ring 136 is made from stainless steel. Therefore, the pressure of the corrugations 150 against the bore 134 causes the stainless steel corrugations 150 to scrape the surface of the bore 134 and thereby shed flakes of aluminum. The aluminum flakes then become trapped as debris within the groove 148. The debris is pushed ahead of the corrugations 150 to collect in crevices 154. Excessive debris collection within the groove 148 may detrimentally impede the movement of the sleeve 142 and thereby impede seek performance.

Figure 4:
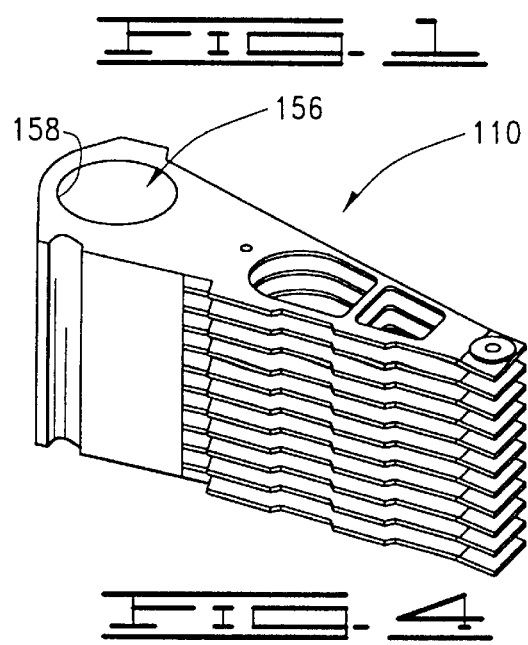
FIG. 4 is a perspective view of the E-block of the disc drive of FIG. 1.
Figure 5:
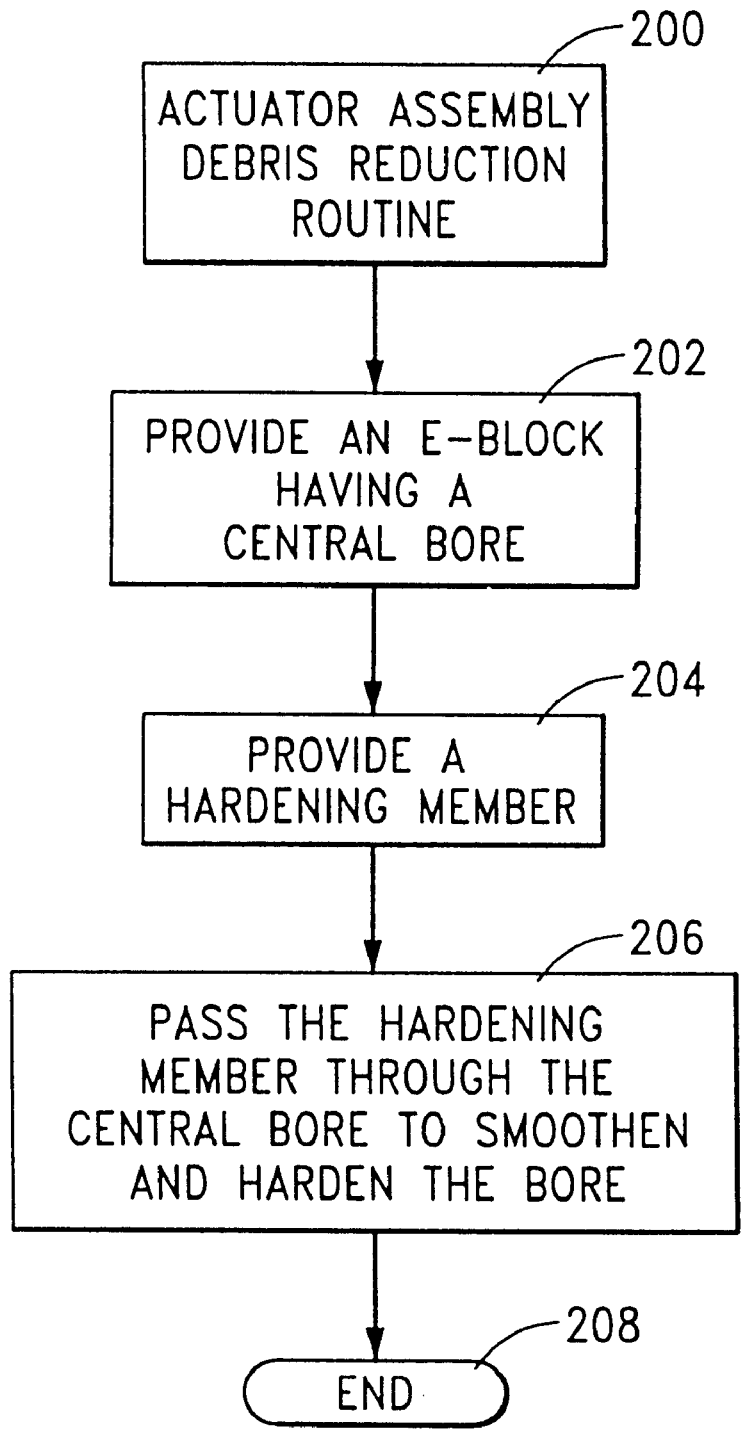
FIG. 5 is a flow chart for an ACTUATOR ASSEMBLY DEBRIS REDUCTION routine, generally setting forth preferred steps carried out to reduce the debris within an actuator assembly.

Accordingly, a preferred embodiment of the present invention is provided, as shown in FIGS. 4–5. FIG. 4 is a perspective view of the E-block 110 and is provided to facilitate discussion of the method of reducing debris therein. Provided in FIG. 5, is a flow chart for an ACTUATOR ASSEMBLY DEBRIS REDUCTION routine 200, detailing the method of tooling the E-block 110 that will reduce the collection of debris therein. Reference will be made to FIG. 4 in describing the steps in FIG. 5 to facilitate discussion. Beginning at step 202, the E-block 110, manufactured by Compart in Chino, Calif., USA, is provided before installation within the disc drive 100. The E-block 110 is made of aluminum and has a central bore 156 (FIG. 4) which has a bore surface 158. The central bore 156 is provided for insertion of the cartridge bearing 112 (FIG. 1) and tolerance ring 115 (FIG. 1).

At step 204, a hardening member (not shown) is provided for hardening and smoothing a bore surface 158. Although it is contemplated that it is within the scope of the present invention that a variety of hardening members may be used to harden and smooth the bore surface 158, in the preferred embodiment, the hardening member is a ball (not shown) with a predetermined hardness, and is preferably made from tungsten carbide. Such balls are readily available in the art. The ball has an outer diameter that is larger than an inner diameter of the bore 156. The ball is then positioned over the bore 156.

At step 206, the hardening member, in the preferred embodiment, the ball, is passed through the bore 156 to both harden and smooth the bore surface 158. The ball may be pressed through using any means commonly known to one of ordinary skill in the art. As the ball is pressed through the bore 156, the bore surface 158 is crushed and simultaneously deformed to provide a substantially smooth, hardened bore surface 158. The aluminum bore surface 158 therefore provides a substantially smooth, hard medium upon which the stainless steel tolerance ring 115 pressingly engages. The aluminum off the bore surface 158 will therefore be less likely to flake off since the tolerance ring 115 is likely to scratch and scrape an already smooth and hardened surface. The smooth, hardened bore surface 158 therefore substantially prevents the collection of debris within the bore 156. The smooth and hardened bore surface 158 then also has the additional benefit of providing ease of insertion of the cartridge bearing 112 therein. Hardening the bore surface 158 may be repeated during rework of the E-block 110 after removal of the cartridge bearing 112 and tolerance ring 115 to further improve the hardness of the bore surface 158 and therefore further prevent the risk of debris collection. The routine then ends at step 208.

In an alternative embodiment, a roller burnishing tool (not shown) may be used to harden and smooth the bore surface 158. The present invention uses the roller burnishing tool by methodology well known in the art. The roller burnishing tool has roller bearings which have diameters that are slightly larger than the inner diameter of the bore 156. Therefore, as with the ball, the roller burnishing tool is compressingly passed through the bore 156 so that the roller bearings deform the bore surface 158 to create a substantially smooth, hardened bore surface 158.

From the above description, it will be clear that the present invention is directed to a method of hardening an E-block to reduce debris collection therein. As exemplified by a preferred embodiments, the method involves first providing a manufactured E-block for tooling. The E-block has a central bore with an inner diameter and a bore surface. A hardening member is then provided with an outer diameter that is larger than the inner diameter of the bore surface. The hardening member is pressed through the central bore so that the hardening member compresses and deforms the bore surface. As the hardening member deforms the bore surface, the bore surface becomes substantially smooth and hard. The aluminum bore surface therefore provides a substantially smooth, hard medium upon which a tolerance ring pressingly engages after assembly. The tolerance ring will be less likely to flake off such a substantially smooth and hard contacting bore surface thereby reducing the collection of debris within the bore.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for hardening an E-block of an actuator assembly in a disc drive, the method comprising steps of:
   (a) providing the E-block with a central bore having a bore surface at an inner diameter; and
   (b) passing a hardening member through the central bore to improve disc drive operational performance by hardening and smoothing the bore surface so that the generation of debris-generating material is reduced from the E-block when the E-block engages a corrugated tolerance ring during installation of the E-block into the disc drive.

2. The method of claim 1, wherein the hardening member comprises a ball having a predetermined hardness and an outer diameter greater than the inner diameter of the bore surface, and wherein the passing step (b) comprises a step of pressing the ball through the central bore to burnish the bore surface.

3. The method of claim 2, wherein the passing step (b) further comprises a step of simultaneously deforming the bore surface of the central bore.

4. The method of claim 1, wherein the bore surface is aluminum.

5. The method of claim 1, wherein the hardening member comprises a roller burnishing tool comprising roller bearings each having a predetermined hardness and an outer diameter greater than the inner diameter of the bore surface, and wherein the passing step (b) comprises a step of pressing the roller burnishing tool through the central bore to burnish the bore surface.

6. The method of claim 5, wherein the passing step (b) further comprises a step of simultaneously deforming the bore surface of the central bore.

7. A method for forming an actuator assembly for use in a disc drive comprising steps of:
   (a) providing an E-block having an initial hardness and a central bore having a bore surface at an inner diameter;
   (b) providing a hardening member having a predetermined hardness greater than the initial hardness of the E-block and an outer diameter greater than the inner diameter of the bore surface;
   (c) passing the hardening member through the central bore to harden and smooth the bore surface;
   (d) providing a bearing cartridge assembly having an outer sleeve;
   (e) placing a corrugated tolerance ring about the outer surface of the bearing cartridge assembly; and
   (f) disposing the bearing cartridge assembly and the corrugated tolerance ring within the central bore of the E-block so that the corrugated tolerance ring presses against the hardened and smoothed bore surface to retain the cartridge bearing assembly and the corrugated tolerance ring within the central bore, the hardened and smoothed bore surface improving the operational performance of the disc drive by reducing the generation of debris from the E-block when the E-block engages the corrugated tolerance ring.

8. The method of claim 7, wherein the hardening member comprises a ball.

9. The method of claim 7, wherein the hardening member comprises a roller burnishing tool comprising a plurality of roller bearings.

10. The method of claim 7, wherein the bore surface is aluminum.

* * * * *